US011621587B1

(12) United States Patent
Yanovitz et al.

(10) Patent No.: US 11,621,587 B1
(45) Date of Patent: Apr. 4, 2023

(54) CONFIGURABLE PLASMA GENERATING SYSTEM

(71) Applicant: CAPS Medical Ltd., Netanya (IL)

(72) Inventors: Leonid Yanovitz, Rishon LeZion (IL); Ilan Oleg Uchitel, Kfar-Saba (IL); Boris Kogan, Kiriat-Motzkin (IL)

(73) Assignee: CAPS Medical Ltd., Netanya (IL)

( * ) Notice: Subject to any disclaimer, the term of this patent is extended or adjusted under 35 U.S.C. 154(b) by 0 days.

(21) Appl. No.: 17/971,737

(22) Filed: Oct. 24, 2022

Related U.S. Application Data (63) Continuation-in-part of application No. 17/866,700, filed on Jul. 18, 2022.

(51) Int. Cl.
  *H02J 50/12* (2016.01)
  *H01F 38/14* (2006.01)
  *H02J 50/90* (2016.01)

(52) U.S. Cl.
  CPC .............. *H02J 50/12* (2016.02); *H01F 38/14* (2013.01); *H02J 50/90* (2016.02)

(58) Field of Classification Search
  None
  See application file for complete search history.

(56) References Cited

U.S. PATENT DOCUMENTS

| | | | |
|---|---|---|---|
| 6,321,531 B1 * | 11/2001 | Caren | C10L 1/1233 204/173 |
| 6,326,584 B1 * | 12/2001 | Jewett | H01J 37/32174 219/121.57 |
| 10,692,704 B2 * | 6/2020 | Louis | H01J 37/32348 |
| 11,166,762 B2 * | 11/2021 | Eckert | A61B 5/0507 |

(Continued)

FOREIGN PATENT DOCUMENTS

| | | | |
|---|---|---|---|
| ES | 2556231 | 1/2016 | |
| ES | 2556231 T3 * | 1/2016 | ........... A61B 18/042 |

(Continued)

OTHER PUBLICATIONS

Official Action dated Sep. 26, 2022 from US Patent and Trademark Office Re. U.S. Appl. No. 17/866,700. (15 pages).

(Continued)

*Primary Examiner* — Srinivas Sathiraju (57) ABSTRACT

Power circuitry for non-thermal plasma generation; optionally therapeutic plasma. Non-thermal plasma is generated distally by a catheter-like device which is flexible, narrow (e.g., diameter <5 mm), and longitudinally extended to reach, e.g., 50-100 cm into body cavities. A plasma probe power transmission cable is a part of the power generating circuit, its intrinsic impedance contributing to and constraining the time constant of an entraining RC circuit whose resonant frequency entrains the frequency of power generation by feedback. Variable length, construction and/or manufacture (for example) of the plasma probe potentially lead to different time constants. In some embodiments, transformer coupling is divided into a plurality of stages, allowing the final-stage transformer inductance to be selected with sufficient headroom to allow the use of compensation componentry to mask probe variability and maintain a targeted operating frequency. Various configurations for selecting and/or providing compensation componentry are disclosed.

22 Claims, 4 Drawing Sheets

(56) References Cited

U.S. PATENT DOCUMENTS

| | | | |
|---|---|---|---|
| 2008/0112202 A1* | 5/2008 | Hu | H02M 7/539 363/132 |
| 2010/0247403 A1* | 9/2010 | Hancock | A61L 2/14 422/186.29 |
| 2012/0268969 A1* | 10/2012 | Cuk | H02M 7/48 363/37 |
| 2013/0267943 A1* | 10/2013 | Hancock | H05B 6/806 606/33 |
| 2014/0246364 A1* | 9/2014 | Hruska | C02F 1/78 204/554 |
| 2014/0246381 A1* | 9/2014 | Buchanan | C01B 13/115 210/748.19 |
| 2014/0319382 A1* | 10/2014 | Hancock | H05H 1/46 315/111.21 |
| 2015/0078053 A1* | 3/2015 | Harrison | H02M 7/4807 363/132 |
| 2015/0097434 A1* | 4/2015 | Harrison | H02M 7/44 307/43 |
| 2015/0157870 A1* | 6/2015 | Kalghatgi | H05H 1/2406 604/23 |
| 2015/0232353 A1* | 8/2015 | Denvir | C02F 1/78 210/150 |
| 2016/0123927 A1* | 5/2016 | Persson | G01N 27/628 315/111.21 |
| 2016/0194224 A1* | 7/2016 | Buchanan | H02M 1/12 204/554 |
| 2016/0197564 A1* | 7/2016 | Buchanan | C02F 1/78 363/123 |
| 2016/0233059 A1* | 8/2016 | Hensley | H05H 1/2406 |
| 2016/0251240 A1* | 9/2016 | Fraser | C02F 1/008 204/664 |
| 2017/0014184 A1* | 1/2017 | Hancock | A61B 18/1492 |
| 2017/0246468 A1* | 8/2017 | Kalghatgi | A61N 1/44 |
| 2017/0313603 A1* | 11/2017 | Fraser | C02F 1/008 |
| 2019/0036346 A1* | 1/2019 | Hruska | H01F 27/24 |
| 2019/0206658 A1* | 7/2019 | Roy | H01J 37/32348 |
| 2019/0230779 A1* | 7/2019 | Sanders | H01J 37/32174 |
| 2019/0391387 A1* | 12/2019 | Neophytou | H01J 37/32541 |
| 2020/0325049 A1* | 10/2020 | Roy | A61L 2/202 |
| 2021/0051790 A1* | 2/2021 | Yancey | H05H 1/30 |
| 2021/0068896 A1* | 3/2021 | Eckert | G01R 29/0892 |

FOREIGN PATENT DOCUMENTS

| | | | | |
|---|---|---|---|---|
| ES | 2688300 | | 10/2018 | |
| ES | 2688300 T3 | * | 10/2018 | ........... A61B 18/042 |

OTHER PUBLICATIONS

Ayachit et al. "Transfer Functions of a Transformer at Different Values of Coupling Coefficient", IET Circuits and Devices Systems, 10(4): 337-348, Jul. 1, 2016.

* cited by examiner

FIG. 10

CONFIGURABLE PLASMA GENERATING SYSTEM

RELATED APPLICATIONS

This application is a Continuation-in-Part (C.I.P.) of U.S. patent application Ser. No. 17/866,700 filed on Jul. 18, 2022, the contents of which are all incorporated by reference as if fully set forth herein in their entirety.

FIELD AND BACKGROUND OF THE INVENTION

The present invention, in some embodiments thereof, relates to the field of plasma generation and more particularly, but not exclusively, to plasma power supply design.

Non-Thermal Atmospheric Plasma (MAP), also referred to as Cold Atmospheric Plasma (CAP), is a near room-temperature ionized gas composed of various neutral and charged species. It is widely used in various application fields and industries, including in medicine where its beneficial characteristics are well established. Application of NTAP on tissue exerts complex and unique impact both on cell/tissue level and systemic level.

NTAP may be generated by Dielectric Barrier Discharge (DBD), wherein a flowing gas (typically, a noble gas such as Helium or Argon) is ionized by an electrode upon which high voltage is periodically applied, the electrode is covered by a dielectric barrier, such that no direct ohmic path is generated between the driving source and the applied target tissue.

SUMMARY OF THE INVENTION

According to an aspect of some embodiments of the present disclosure, there is provided power supply circuitry for a non-thermal plasma generator, the circuitry including: a driver circuit, configurable to generate an alternating current power signal at an operating frequency of at least 500 kHz; an output stage circuit, connected to receive the alternating current power signal from the driver circuit, and to provide a feedback signal to the driver circuit entraining the driver circuit to produce the power signal at the operating frequency; a plasma probe having a distal end including a plasma generating site, and a proximal end coupled to the driver circuit via the output stage circuit, the distal and proximal ends being interconnected by a transmission line having an intrinsic capacitance in proportion to a length of the transmission line; the output stage circuit having plurality of transformers including at least a final transformer and an initial gain transformer; at least one compensation capacitor, selectable and/or adjustable among a plurality of capacitances; wherein a selected and/or adjusted compensation capacitor of the at least one compensation capacitor: is positioned in electrical parallel with the intrinsic capacitance of the transmission line, and has a capacitance that compensates an LC network including the intrinsic capacitance and a secondary coil of the final transformer to resonate at the operating frequency, when the driver circuit is operated to generate the power signal.

According to some embodiments of the present disclosure, the final transformer includes the secondary coil and a primary coil, and is electrically connected from the secondary coil of the final transformer to the plasma probe, and the initial gain transformer includes a secondary coil and a primary coil, and is electrically connected to the plasma probe from the secondary coil of the initial gain transformer via the final transformer, and electrically connected to the driver circuit from the primary coil of the initial gain transformer.

According to some embodiments of the present disclosure, an inductance of the secondary coil of the final transformer is selected so that the LC network resonates at the operating frequency when a longest supported plasma probe having a longest supported transmission line length is connected without the selected and/or adjusted compensation capacitor; the plasma probe has a transmission line length shorter than the longest supported transmission line length; and a sum of the capacitance of the selected and/or adjusted compensation capacitor and the intrinsic capacitance of the shorter transmission line is matched to the intrinsic capacitance of the longest supported transmission line.

According to some embodiments of the present disclosure, the selected and/or adjusted compensation capacitor is provided as component of the plasma probe, and is selected by selection of the plasma probe.

According to some embodiments of the present disclosure, a proximal-side connector of the plasma probe includes the at least one compensation capacitor.

According to some embodiments of the present disclosure, the at least one compensation capacitor is provided together with the driver circuit, and the plasma probe electrically connects to it upon being attached to the driver circuit through the output stage circuit.

According to some embodiments of the present disclosure, the at least one compensation capacitor includes a plurality of compensation capacitors, and the power supply circuitry includes a controller to select the selected and/or adjusted compensation capacitor from among the plurality of compensation capacitors and connect it to the plasma probe.

According to some embodiments of the present disclosure, the controller includes a manually operated switch.

According to some embodiments of the present disclosure, the controller includes an electrically operated switch.

According to some embodiments of the present disclosure, the electrically operated switch is one of a plurality of multiplexed switches.

According to some embodiments of the present disclosure, the controller selects and/or adjusts the selected and/or adjusted compensation capacitor according to user-inputted commands from a graphical user interface.

According to some embodiments of the present disclosure, the controller selects and/or adjusts the selected and/or adjusted compensation capacitor in accordance with an identifier element associated with the plasma probe and providing an identifier sensed by the identifier detector, and a compensation capacitance associated with the identifier.

According to some embodiments of the present disclosure, the identifier includes a resistance value measured when the plasma probe is electrically connected to the driver circuit.

According to some embodiments of the present disclosure, the identifier includes a numeric value.

According to some embodiments of the present disclosure, the controller selects the compensation capacitor based on an identified actual frequency of operation of the device, and its difference from the operating frequency of at least 500 kHz.

According to an aspect of some embodiments of the present disclosure, there is provided a method of plasma generation, the method including: providing a power supply configured to drive a higher-capacitance plasma probe at a first frequency in conjunction with a secondary coil of a coupling transformer, the capacitance of the higher-capacitance plasma probe including an intrinsic capacitance of a transmission line of the higher-capacitance plasma probe; providing a lower-capacitance plasma probe having a transmission line with a lower intrinsic capacitance than the intrinsic capacitance of the transmission line of the higher-capacitance plasma probe; selecting a compensating capacitor, based on the difference between the capacitances of the higher-capacitance plasma probe and the lower-capacitance plasma probe; electrically connecting the compensating capacitor in parallel with the intrinsic capacitance of the lower-capacitance plasma probe; and operating the lower-capacitance plasma probe at the first frequency.

According to some embodiments of the present disclosure, an RC network including the secondary coil and the transmission line of the lower-capacitance plasma probe, and without the compensating capacitor, resonates at a second frequency higher than the first frequency.

According to some embodiments of the present disclosure, the RC compensating capacitor has a capacitance about equal to the difference between the capacitances of the higher-capacitance plasma probe and the lower-capacitance plasma probe.

According to some embodiments of the present disclosure, the selecting selects the compensation capacitor from among a plurality of capacitors and/or adjusts a capacitance of the compensation capacitor.

According to an aspect of some embodiments of the present disclosure, there is provided a set of at least two plasma probes, each including a respective distally-positioned plasma generating site, a proximally-positioned connector configured to connect to a plasma power supply, and a transmission line interconnecting the connector and the plasma generating site; and wherein: the plasma probes each comprise a respective compensation capacitor, the compensation capacitors have rated values at least 10% different than one another, and respective intrinsic capacitances of the transmission lines are more different from one another in capac'itance value than respective sums of intrinsic capacitances and compensation capacitors are different from one another in capacitance value.

According to some embodiments of the present disclosure, the difference in capacitance values of the transmission lines is reduced by at least by a factor of 2 in the respective sums of intrinsic capacitance and compensation capacitor capacitance.

According to some embodiments of the present disclosure, transmission lines are different from each other in length by at least 10 cm.

Unless otherwise defined, all technical and/or scientific terms used herein have the same meaning as commonly understood by one of ordinary skill in the art to which the present disclosure pertains. Although methods and materials similar or equivalent to those described herein can be used in the practice or testing of embodiments of the present disclosure, exemplary methods and/or materials are described below. In case of conflict, the patent specification, including definitions, will control. In addition, the materials, methods, and examples are illustrative only and are not intended to be necessarily limiting.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system" (e.g., a method may be implemented using "computer circuitry"). Furthermore, some embodiments of the present disclosure may take the form of a computer program product embodied in one or more computer readable medium(s) having computer readable program code embodied thereon. Implementation of the method and/or system of some embodiments of the present disclosure can involve performing and/or completing selected tasks manually, automatically or a combination thereof. Moreover, according to actual instrumentation and equipment of some embodiments of the method and/or system of the present disclosure, several selected tasks could be implemented by hardware, by software or by firmware and/or by a combination thereof, e.g., using an operating system.

For example, hardware for performing selected tasks according to some embodiments of the present disclosure could be implemented as a chip or a circuit. As software, selected tasks according to some embodiments of the present disclosure could be implemented as a plurality of software instructions being executed by a computer using any suitable operating system. In some embodiments of the present disclosure, one or more tasks performed in method and/or by system are performed by a data processor (also referred to herein as a "digital processor", in reference to data processors which operate using groups of digital bits), such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well. Any of these implementations are referred to herein more generally as instances of computer circuitry.

Any combination of one or more computer readable medium(s) may be utilized for some embodiments of the present disclosure. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium may also contain or store information for use by such a program, for example, data structured in the way it is recorded by the computer readable storage medium so that a computer program can access it as, for example, one or more tables, lists, arrays, data trees, and/or another data structure. Herein a computer readable storage medium which records data in a form retrievable as groups of digital bits is also referred to as a digital memory. It should be understood that a computer readable storage medium, in some embodiments, is optionally also used as a computer writable storage medium, in the case of a computer readable storage medium which is not read-only in nature, and/or in a read-only state.

Herein, a data processor is said to be "configured" to perform data processing actions insofar as it is coupled to a computer readable medium to receive instructions and/or data therefrom, process them, and/or store processing results in the same or another computer readable medium. The processing performed (optionally on the data) is specified by the instructions, with the effect that the processor operates according to the instructions. The act of processing may be referred to additionally or alternatively by one or more other terms; for example: comparing, estimating, determining, calculating, identifying, associating, storing, analyzing, selecting, and/or transforming. For example, in some embodiments, a digital processor receives instructions and data from a digital memory, processes the data according to the instructions, and/or stores processing results in the digital memory. In some embodiments, "providing" processing results comprises one or more of transmitting, storing and/or presenting processing results. Presenting optionally comprises showing on a display, indicating by sound, printing on a printout, or otherwise giving results in a form accessible to human sensory capabilities.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium and/or data used thereby may be transmitted using any appropriate medium, including but not limited to wireless, wireline, optical fiber cable, RF, etc., or any suitable combination of the foregoing.

Computer program code for carrying out operations for some embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some embodiments of the present disclosure may be described below with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Some of the methods described herein are generally designed only for use by a computer, and may not be feasible or practical for performing purely manually, by a human expert. A human expert who wanted to manually perform similar tasks, such inspecting objects, might be expected to use completely different methods, e.g., making use of expert knowledge and/or the pattern recognition capabilities of the human brain, which would be vastly more efficient than manually going through the steps of the methods described herein.

BRIEF DESCRIPTION OF THE SEVERAL VIEWS OF THE DRAWINGS

Some embodiments of the present disclosure are herein described, by way of example only, with reference to the accompanying drawings. With specific reference now to the drawings in detail, it is stressed that the particulars shown are by way of example, and for purposes of illustrative discussion of embodiments of the present disclosure. In this regard, the description taken with the drawings makes apparent to those skilled in the art how embodiments of the present disclosure may be practiced.

In the drawings.

DESCRIPTION OF SPECIFIC EMBODIMENTS OF THE INVENTION

The present invention, in some embodiments thereof, relates to the field of plasma generation and more particularly, but not exclusively, to plasma power supply design.

Overview

An aspect of some embodiments of the present disclosure relates to modification and/or control of the properties of the output section of a plasma power generator. In some embodiments, the output section comprises a plurality of transformer stages. In some embodiments, the output section's operating characteristics (e.g., its operating frequency) result in part from the impedance of a transmission line (e.g., its capacitance, which may be proportional to length).

In some embodiments, the operating characteristics of the output section of a plasma power generator are inherently affected by transmission line impedance that is, not merely affected an aspect of design choice, but actually operating differently depending on the characteristics of the currently connected transmission line. The effect on operating characteristics may be demonstrated, for example, by a change in the impedance of the transmission line resulting in an immediate effect on the plasma power generator's ability to produce, at any location of the circuit, a signal suitable for efficient plasma generation. The signal may be prevented entirely, and/or characteristics of that signal such as frequency and/or amplitude may be changed from a range useful in generating plasma. For example, in some embodiments, a feedback signal from the output section of a plasma power generator is used to entrain oscillation of an earlier stage of power generation. When the output section is unable to respond at an appropriate frequency, the earlier stage, lacking feedback, also fails to generate it. Effects on operating characteristics may be distinguished from impedance matching as such, wherein the signal is generated regardless of the impedance of the transmission line, but the impedance of the generating circuit and transmission line are matched so that the signal can more efficiently travel into the transmission line, rather than be reflected back into the power generator.

In some embodiments, the transmission line is an element of a plasma delivery probe. The plasma delivery probe is long, thin, and flexible (e.g., catheter- and/or wire-like in construction), allowing its introduction to body cavities by pushing from a proximal location. The probe typically includes a discharge gas conduit extending alongside the electrically conductive elements of the transmission line, leading to a site of plasma generation at a distal end of the plasma probe where discharge gas and a transmitted electrical signal interact to generate plasma. Additionally or alternatively, discharge gas is introduced by another method, e.g., via a lumen of a second probe.

The plasma delivery probe, in some embodiments, generates non-thermal atmospheric plasma (NTAP), also referred to as "cold" plasma. Generally, the temperature of the non-thermal plasma is to be maintained at less than 50° C.; or a lower temperature, for example, less than 40° C. or less than 30° C.

To be effective in producing plasma, the signal which is generated (and transmitted along the transmission line to a site of plasma generation) is, in some embodiments, of a relatively high voltage (e.g., 500 V or more). For suitably efficient plasma generation, the signal frequency may be, for example, in the range of about 500 kHz to about 10 MHz. At lower frequencies, plasma generation may tend to extinguish intermittently, e.g., due to shielding by mobile charged species, reducing efficiency. At lower voltages, plasma may not be generated at all.

In some embodiments wherein the transmission line impedance inherently affects the operating characteristics of the output section, this occurs because capacitance of the transmission line provides part of the inductance of resonating LC circuit that provides frequency-entraining feedback onto earlier stage of power generation. Particularly when the transmission line is several tens of centimeters long (e.g., 50 cm-2 m), these operating requirements potentially become significant constraints on power generating circuit design.

In particular, other things being equal: as the chosen transmission line length increases, the transmission line's impedance contribution (e.g., its capacitance) tends to increase as well. This in turn tends to increase the time constant of any particular LC circuit it is a part of. In some embodiments, to provide an operating frequency at a level high enough for efficient plasma generation, this creates a particular design problem. The output stage, relying on coil transformation, should create a relatively high voltage gain (e.g., 20-50 overall gain), while also maintaining a high resonant frequency. But the high frequency requirement implies a relatively low output (secondary) coil inductance (so that the LC time constant stays low), and the high gain requirement tends to drive this lower still on the input coil (primary coil). In a single transformer stage implementation, this can result in a theoretical circuit that calls for a low-impedance coil that, in practice, cannot handle the required power and/or voltage slew rate.

In some embodiments of the present disclosure, this is handled by dividing the output stage into two or more transformer stages. An earlier stage is thereby separated from the high capacitance of the transmission line, allowing the selection of higher-impedance transformers to generate gain. With the gain requirement handled, a later stage can use approximately equal (or at least more nearly equal) transformer coils on both the input and output sides, so that the input transformer coil does not need to be impractically small.

Transmission line impedance differ not only according to length, but additionally or alternatively based on other construction aspects; e.g., transmission line cable cross-sectional geometry and/or materials. Ordinary variations in transmission line manufacture may also lead to differences in electrical properties such as cable impedance. It should be noted that plasma probes, in some embodiments, are considered consumables (e.g., to avoid complications such as re-sterilization). Thus, instead of calibrating a probe to a power supply in the factory, there may be a practical requirement that many different probes be usable with the same power supply and perhaps probes produced as part of different batches (e.g., with different cable sources), and/or probes which are different versions or even models.

As transmission line internal electrical properties change (e.g., as a result of component modification or exchange; and/or viewed from the standpoint of manufacturing tolerances), maintaining the same power output properties (e.g., the same amplitude and/or frequency of power output) may be achieved for the overall circuit, if one or more other circuit components are modified.

When constraints on the circuit design are very tight, however, the freedom to make such modifications is low. This could lead to a requirement to produce the transmission line to inconveniently (or even impractically) strict tolerances. The inventors have realized that design freedom created by separation of output stage duties (high gain vs. high frequency resonance with included transmission line capacitance) also creates more freedom for accommodating variability in transmission line impedance. Additionally or alternatively, the additional freedom in component characteristics may be used to tune power signal properties such as frequency.

For example: in some embodiments, this freedom is used by providing a final transformer stage with coil inductances even lower than necessary to achieve frequency matching with some practically manufacturable transmission lines of a needed length, in order to enable working with a larger range of transmission lines. In effect, the final-stage inductances set the maximum capacitance of a transmission line that the output stage can interface with.

In some embodiments, transmission lines of plasma probes are themselves made "worse" by adding (e.g., at the time of manufacture and/or calibration), however much additional capacitance is needed to couple with the final transformer stage impedances to resonate at the targeted operating frequency. The highest-capacitance transmission lines need no added capacitance. This potentially helps to improve the manufacturability of plasma probes, since variations in probe capacitance can be removed by adjustment.

In some embodiments, the "extra capacitance" is provided as part of the plasma power generator. There may be, for example, an adjustable variable capacitor provided, or a plurality of capacitors (fixed, or optionally adjustable through different ranges). Capacitor selection/adjustment is made according to the particular properties of the connected plasma probe and its transmission line.

Where a plurality of capacitors is provided, they may be selected by a choice of which port of the power supply a plasma probe is connected to, and/or by an internal multiplexer (e.g., a multiplexing integrated circuit, a bank of relay switches, or another implementation). The internal multiplexer may itself make capacitor selection(s) under the control of a user interface; either mechanical (e.g., a rotary switch) or electronic (e.g., a graphical user interface (GUI)).

Additionally or alternatively, selection is automatic. For example, a digital or analog (e.g., a resistor) identifier may be provided to each plasma probe, and the multiplexer controlled to select auxiliary capacitance according to the identifier sensed when the plasma probe is plugged in or otherwise placed in communication with the power output generator.

In some embodiments, auxiliary capacitance selection is automatic based on feedback from actual circuit performance; e.g., the probe may be induced to oscillate with a test circuit, and the actual operating capacitor selected according to the oscillation frequency found by testing. In some embodiments, the test circuit is simply normal plasma generating circuitry. In some embodiments, a separate test circuit is provided.

In some embodiments, output stage circuit adjustment is provided by adjusting inductance in at least the last transformer stage. For example, a plurality of transformers are provided, each with a different secondary inductance, and selected by multiplexing. For this purpose, there may be provided a single primary coil with a selectable plurality of secondary coils, or there may be different transformer selected by each setting. Optionally, the inductance of a coil is variably selected; e.g., by selecting different taps on the same coil. Transformer selection has the potential advantage of avoiding a need to add extra capacitance, thereby allowing a potentially more robust transformer to be selected when transmission line capacitance is low enough to allow it.

Other uses of selectably matched transmission line and output stage impedances include variable output frequency selection, for example as a way of controlling plasma power.

By increasing the number of transformer stages of the output stage beyond two, the feedback signal to the earlier stage of power signal generation is potentially made less sensitive to changes in the impedance of the transmission line. Roughly put, the added transformer stages of the output stage each have their own natural resonant frequency, which combines among the transformer stages in weighted fashion to produce the frequency of the feedback signal. The feedback signal must be within a range that the earlier power generating stage can accept, or else it will fail to generate an oscillating power signal. When there are more transformer stages, the relative weight of the final transformer stage is lowered. Increasing the gain of the final transformer stage above 1 tends to increase this effect.

It should be noted that a consequence of the reduced weighting of the final transformer stage is that a change in transmission line capacitance will shift the resonant frequency of the final transformer stage more than the operating frequency of the power output generator. This reduces transmission efficiency as is usual for mismatched impedances, even if the power signal itself continues to be generated. However, effects of this loss of transmission efficiency can still be mitigated by providing a selectable range of impedances to bring the final transformer stage resonant frequency into a tolerated range nearer to a frequency optimum. Maintaining efficiency can be useful for enabling power supply portability (e.g., battery operation), and/or reducing component stresses due to heating.

Before explaining at least one embodiment of the present disclosure in detail, it is to be understood that the present disclosure is not necessarily limited in its application to the details of construction and the arrangement of the components and/or methods set forth in the following description anti/or illustrated in the drawings. Features described in the current disclosure, including features of the invention, are capable of other embodiments or of being practiced or carried out in various ways.

Plasma Treatment Device

Figure 1:
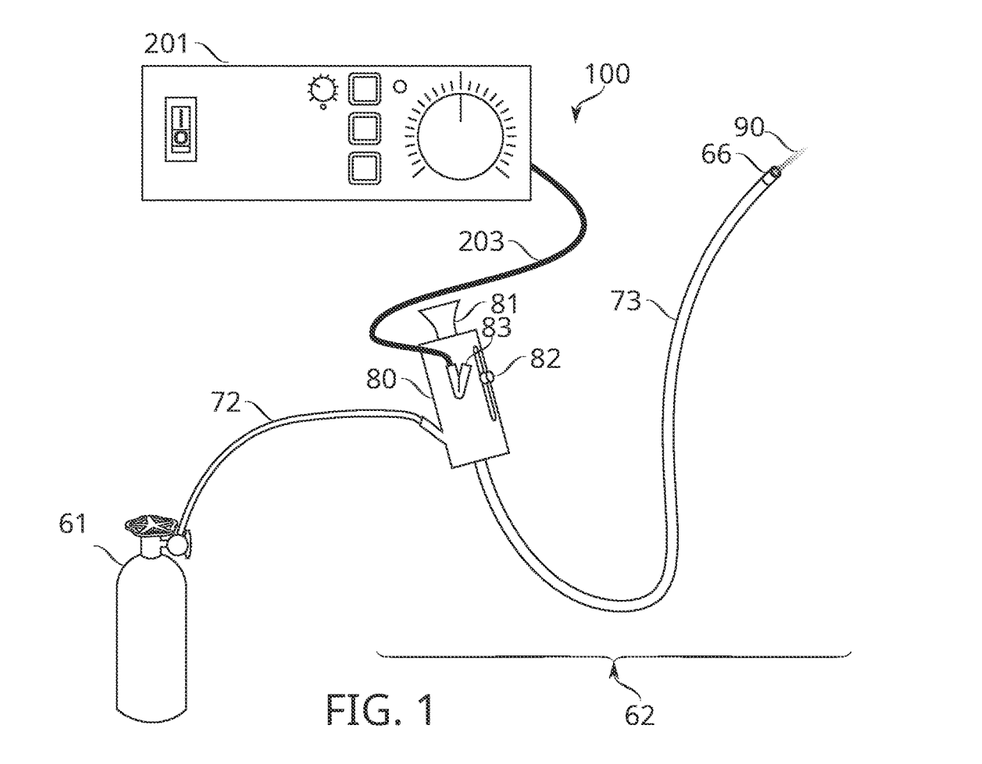
FIG. 1 schematically represents a plasma generating device, according to some embodiments of the present disclosure.

Reference is now made to FIG. 1, which schematically represents a plasma generating device 100, according to some embodiments of the present disclosure.

Plasma generating device 100, in some embodiments, comprises a high voltage power generator 201 and an ionization gas supply 61 interconnected to a plasma probe assembly 62. High voltage power generator 201 supplies ionizing voltage to plasma probe assembly 62 via cable 203 (which may be, for example, a coaxial cable, or another electrical conduit with controlled impedance). Ionizing gas supply 61 supplies an ionization gas to plasma probe assembly 62 via tubing 72. The supplied gas may comprise, for example, one or more noble gases such as neon, argon, or helium; and/or other gas(es) suitable for ionization into a plasma plume 90. Optionally, cable 203 and tubing 72 are integrated into a single cabling unit which connects with plasma probe assembly 62. Optionally, high voltage power generator 201 and ionization gas supply 61 are integrally housed.

Plasma probe assembly 62, optionally comprises a handle 80. Handle 80 is optionally provided with controls 81, 82 for controlling actuation of probe conduit 73 and/or plasma delivery tip 66, for controlling functions of power generator 201, and/or for controlling ionization gas delivery from gas supply 61. Optionally, plasma probe assembly 62 physically integrates power functions and gas delivery functions into probe conduit without use of a dedicated handle. In some embodiments, probe conduit 73 includes both a lumen for delivery of ionization gas, and a high voltage transmission line (e.g., a continuation of cable 203 and tubing 72). In some embodiments, probe conduit comprises a plurality of lumens, e.g., a lumen attached to gas supply 61 which delivers of ionization gas, and a lumen which scavenges (removes) of ionization gas, optionally under suction. In some embodiments, any one or more of the lumens of probe conduit 73 is optionally used as a working channel, by insertion of a tool. Handle 80, in some embodiments, comprises one or more ports 83 for introduction of such tools into a lumen of probe conduit 73.

In some embodiments of the present invention, probe conduit 73 and plasma delivery tip 66 are sized and otherwise configured (e.g., safety-configured) for the delivery of non-thermal plasma to an intrabody location. The intrabody location may be remotely located relative to a point of insertion, e.g., distant from a point of insertion into the body by 25 cm or more; for example, 50 cm, 80 cm, 100 cm, or 120 cm. In some embodiments, the range reachable includes at least the range between 50-100 cm. Insofar as plasma tip 60 comprises the site of plasma generation (as it does in some embodiments), the device must supply ionization-level voltage (e.g., a voltage of 1 kV or more) to the tip 60. This length may place a constraint on the minimum capacitance of cable 203.

In some embodiments, probe conduit 73 (including both a lumen for delivery of ionization gas and high voltage transmission line) has an overall diameter of less than 12 mm, less than 10 mm, less than 8 mm, or less than 5 mm. The narrower the overall diameter, the narrower the minimum-sized body lumen that the probe conduit can traverse in the manner of a catheter; for example, a ureter, blood vessel, or other subcutaneous access-way to a targeted treatment site.

Power Supply Output Stage with a Plurality of Transformer Stages

Figure 2:
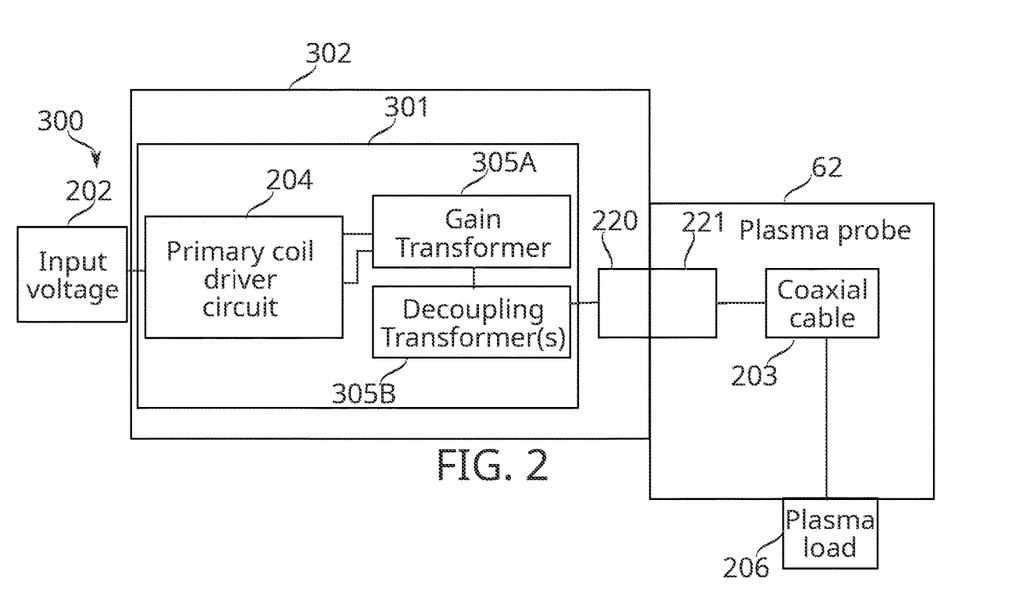
FIG. 2 schematically illustrate a resonating high-voltage plasma generating system, according to some embodiments of the present disclosure.

Reference is now made to FIG. 2, which schematically illustrate a resonating high-voltage plasma generating system 300, according to some embodiments of the present disclosure. Generator 301 divides tasks of providing voltage gain and coupling to a plasma s probe 62 among two transformer stages: a gain transformer 305A, and a decoupling transformer 305B. Optionally, more transformer stages than two are used; for the sake of discussion, stages beyond the first are considered part of the "decoupling transformers" (although any or all of them may also provide some gain), and the transformer stage that connects to plasma probe 62 without another intervening transformer stage is the "final transformer stage".

In some embodiments, this allows driving a relatively high-capacitance load while retaining potential advantages of a resonating architecture to achieve a high frequency and potentially true sinusoidal output while generating plasma.

Considering driver circuit 204 in combination with gain transformer 305A, basic resonance is achieved by matching the time constant of the gain transformer☐ LC network with a feedback LC network in driver circuit 204. The capacitance in the gain transformer's LC network can be selected as a small value (e.g., within a factor of ten of 1-5 pF). This allows its corresponding secondary coil inductance to be substantially higher. This in turn allows the primary and/or feedback coil inductances to be substantially higher, potentially entering into a practical range that allows a gain which was otherwise not available at frequencies of, for example, 1-2 MHz when the capacitance of the plasma probe transmission line 203 is directly connected to the gain transformer.

The remainder of the circuit delivers the high frequency, high voltage signal to the load. Decoupling transformer 305B, when comprising only single stage, has a primary side inductance connected to gain transformer 305A and a secondary side inductance connected to the plasma probe (e.g., through connectors 220, 221).

Optionally, this transformer is configured to unity gain. Inductances are optionally chosen to a value within about a factor of ten of 100 µH, for example, a value within the range of 20-200 µH. Alternatively, this transformer is used as a second stage gain. For example, by the primary coil may be set in a range of 5-20 and the secondary coil in the range of about 20-80 µH; e.g., such that an effective second stage gain of 1-4 (for example, 2) is achieved. The LC network on the secondary (output) side of the transformer (Which includes the capacitance of the transmission line 203) is configured to match the resonance frequency also provided to the driver circuit 204 and the gain transformer 305A.

This configuration allows coupling between frequency and gain to be loosened somewhat by adding an additional design degree of freedom. For example, limitations on coaxial cable length are relaxed it can be longer, and since the gain need not all be provided in the transformer stage it is connected to, the primary coil inductance can be as larger or nearly as large as the secondary coil selected to pair with the transmission line capacitance. Other differences among plasma probes 62 be due, for example, to cable construction, and/or manufacturing variation.

In some embodiments of the present disclosure, it is chosen to make the final stage inductance on the lower side of what can be practically implemented for the requirements of voltage, frequency, and current, leaving "headroom" fir accommodating different transmission line capacitances.

In-Probe Compensation Element

Figure 3:
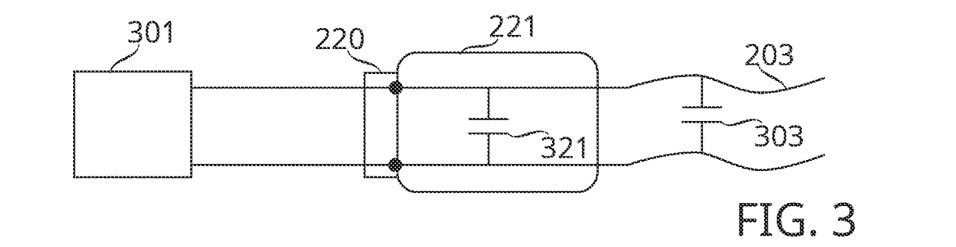
FIG. 3 schematically illustrates a capacitor-calibrated transmission line of a plasma probe, according to some embodiments of the present disclosure.

Reference is now made to FIG. 3, which schematically illustrates a capacitor-calibrated transmission line of a plasma probe, according to some embodiments of the present disclosure.

The outputs from power supply 301 lead to supply-side connector 220, to which plasma probe connector 221 is electrically connected. At the time of manufacture, compensation capacitor 321 is installed, so that the sum of the capacitance 303 of transmission line 203 and compensation capacitor 321 reaches a targeted value.

This may be a single value (or a value within a single uninterrupted tolerance range) that the fixed componentry of power supply 301 is configured to accept. "Accept" in this context means, e.g., that the resonant frequency of decoupling transformer(s) 305B connected together with the summed capacitances of compensation capacitor 321 and the intrinsic capacitance 303 of transmission line 203 is suitably close to the designed operating frequency of the overall system for operation.

Herein the capacitance of a compensation capacitor (also referred to as a compensation element), however selected or provided (e.g., according to any of the examples described herein), is considered to be its rated capacitance; that is, the capacitance which is considered in its selection as a component during device manufacture. Two capacitors which have the same rated capacitance may be, e.g., marked the same as originally manufactured, or placed "in the same bin" after acceptance testing at a site of manufacture.

Herein, "suitably close", in some embodiments, comprises a reduction in deviation of the uncompensated probe's intrinsic capacitance from a target capacitance by a factor of at least 2, 5, 10 or another value, when considered in conjunction with (added to) the capacitance of the compensation capacitor. In some embodiments, compensation capacitance differences used for different probes may be proportional (at least on average for a manufacturing run) to the length which they fall short of some maximal-length supported transmission line. In some embodiments, the values of compensation capacitors used (however selected or provided) for different probes nominally of the same length and construction may vary from one another by up to at least 10%, at least 20%, at least 40%, at least 50%, or another value.

For example, power supply 301 may be configured to accept a transmission line with a certain load capacitance $C_{Coax\{target\}}$ established as preferred (e.g., optimal) for the targeted performance and operating frequency. $C_{Coax\{target\}}$ may be defined with any suitable tolerance, e.g., a range within ±0.1% of a central value; alternatively, ±1%, ±2%, ±5%, or another tolerance range. When the actual capacitance 303 of transmission line 203 capacitance is lower than the value and/or range defined for $C_{Coax\{target\}}$, the difference is made up by the added capacitance of capacitor 321. Accordingly, $C_{Coax}+C_{Connector}=C_{Coax\{target\}}$ (within tolerances) regardless of the used cable.

For example: power supply 301 is configured to drive a 300 pF capacitive load at 1 MHz, which may be equivalent to 3 m coaxial cable that represents the maximum capacity cable for that specific system configuration. With a 3 m plasma probe 62, no compensation element 321 is integrated. With a shorter 2 m probe (measuring, e.g., 200 pF of capacitance), a compensation element of $C_{Connector}=100$ pF is incorporated into the connector so that an overall capacitance of 300 pF is provided.

By this method, the resulting resonance frequency is kept identical for various types and/or lengths of plasma probe transmission line 203. Insofar as the total power output is frequency-dependent, other parameters being equal, the power output remains the same for all probe models as well.

As illustrated, compensation capacitor 321 is incorporated into the plug end of transmission line 203. Additionally or alternatively, compensation capacitor 321 (or a portion of its capacitance) is incorporated at the distal end of the transmission line (plasma generating end).

The compensation capacitor 321, in some embodiments, comprises a discrete capacitor, electrically connected (e.g., soldered) in parallel to the transmission line. Alternatively, as in reality every connector introduces at least some parasitic capacitance into the line, connector 221 may itself be designed to provide all or part of the compensation capacity. This comprises, in some embodiments, selection of the structure of metal surfaces and dielectric materials inside the connector to achieve the required compensation value.

In some embodiments, there are several tolerance ranges made available, and/or the tolerance range may itself be somewhat adjustable, by combining the per-probe capacitance calibration of FIG. 3 with one or more of the methods of FIGS. 3-8.

In some embodiments, where plasma probe length as such is not a critical parameter (at least, within tolerances), plasma probe transmission lines are simply shortened until their intrinsic capacitance matches some target value. The tolerance range may be selected wide enough so that in practice, no more than an acceptable number of rejects is produced, but also narrow enough to ensure that usability and/or user quality perceptions are not impaired. For example, the nominal usable length of the transmission line may be two meters, but the actual length provided may be in a larger range, e.g., 2-3 meters. Optionally, the extra length is gathered to avoid the appearance of excessive irregularity, for example, coiled and bound, or hidden inside a connector with enough empty space to accommodate a significant amount of excess length. In some embodiments, plasma probes are provided as sets (e.g., shipped, stored, or otherwise provided together) which include individual units having differences in transmission line length of 10 cm, 20 cm, 30 cm, or more, but with about the same intrinsic capacitance. In some embodiments, up to 10 cm, 20 cm, 30 cm, or more of the transmission line length is masked or actually hidden by permanent coiling and/or hiding of excess in a connector housing or other container such as housing located along the length of the transmission line (preferably near to its proximal end). In some embodiments, plasma probe length is adjusted after adjustment with an in-probe compensation capacitor. For example, a plasma probe is provided with a compensation capacitor which brings its total capacitance to slightly above a targeted value, while the transmission line shortened to lower the capacitance in a controlled fashion to achieve the targeted value.

In some embodiments, a power supply may be configured to operate within a frequency range selectable from an available plurality of distinct operating frequency ranges. For example, different frequency ranges may be suitable to deliver different amounts of plasma power. In some embodiments, plasma probes are provided as sets including probes individually configured with distinctly different capacitances using different compensating capacitor values. In some embodiments, compensating capacitances are provided as add-ons to probes. For example, there is provided in some embodiments a kit comprising plurality of adaptors, each providing a different compensating capacitance.

Additionally or alternatively, an add-on compensating capacitance adaptor (e.g., from such a kit) can be used to tune probes having different capacitances (e.g., probes provided together in a probe kit) to more closely match one another; e.g., so that they resonate at a common frequency when connected to the power supply, whereas they resonate at different frequencies when the add-on adaptors are not used. This may be useful, for example, to allow a plurality of originally differently-tuned probes to be used simultaneously from different ports of a power supply.

Compensation Element in Generator

Figure 4:
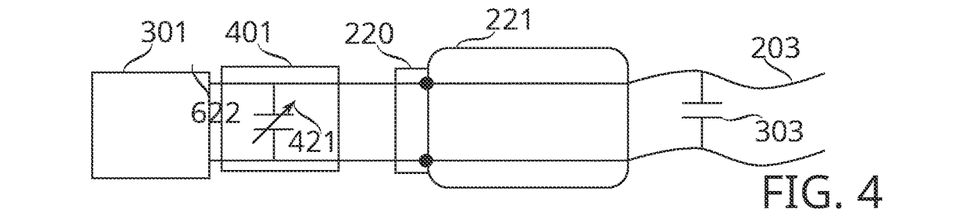
FIG. 4 schematically illustrates a system for variable-capacitor compensation of the intrinsic capacitance of a transmission line of a plasma probe, according to some embodiments of the present disclosure.

Reference is now made to FIG. 4, which schematically illustrates a system for variable-capacitor compensation of the intrinsic capacitance of a transmission line of a plasma probe 62, according to some embodiments of the present disclosure.

Figure 5:
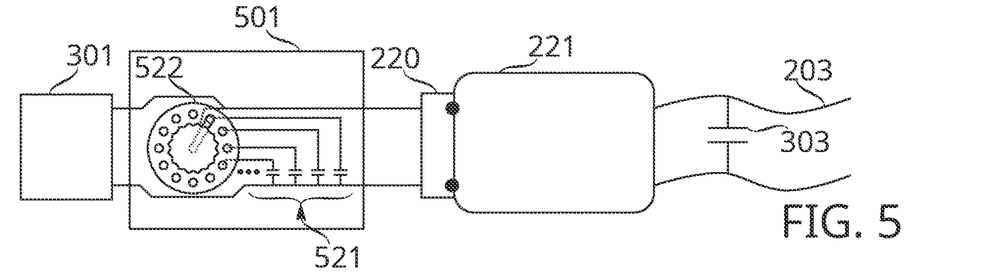
FIG. 5 schematically illustrates selectable-capacitor compensation of the intrinsic capacitance of a transmission line of a plasma probe, according to some embodiments of the present disclosure.
Figure 6A:
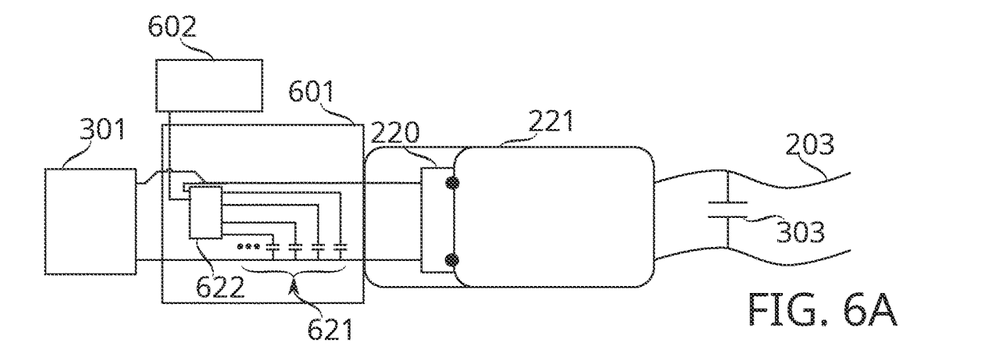
FIGS. 6A-6C schematically illustrate various methods of controlling multiplexed capacitor compensation of the intrinsic capacitance of a transmission line of a plasma probe, according to some embodiments of the present disclosure.
Figure 6B:
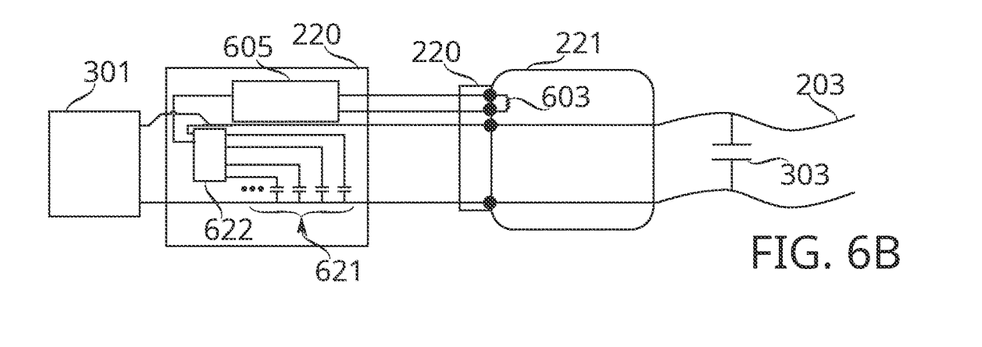
Figure 6C:
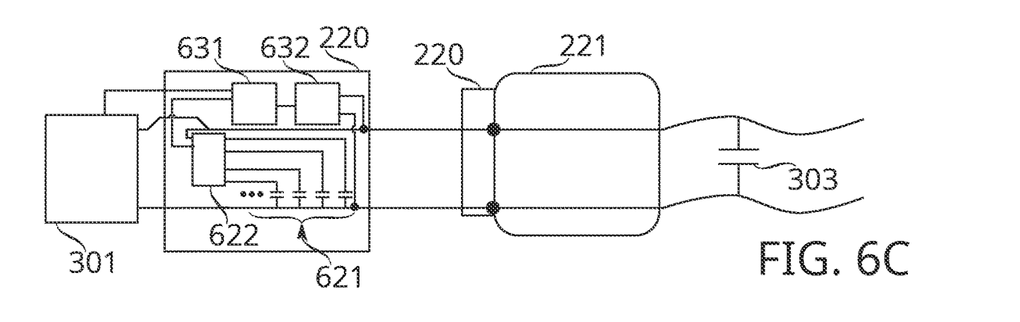
Figures 7, 8:
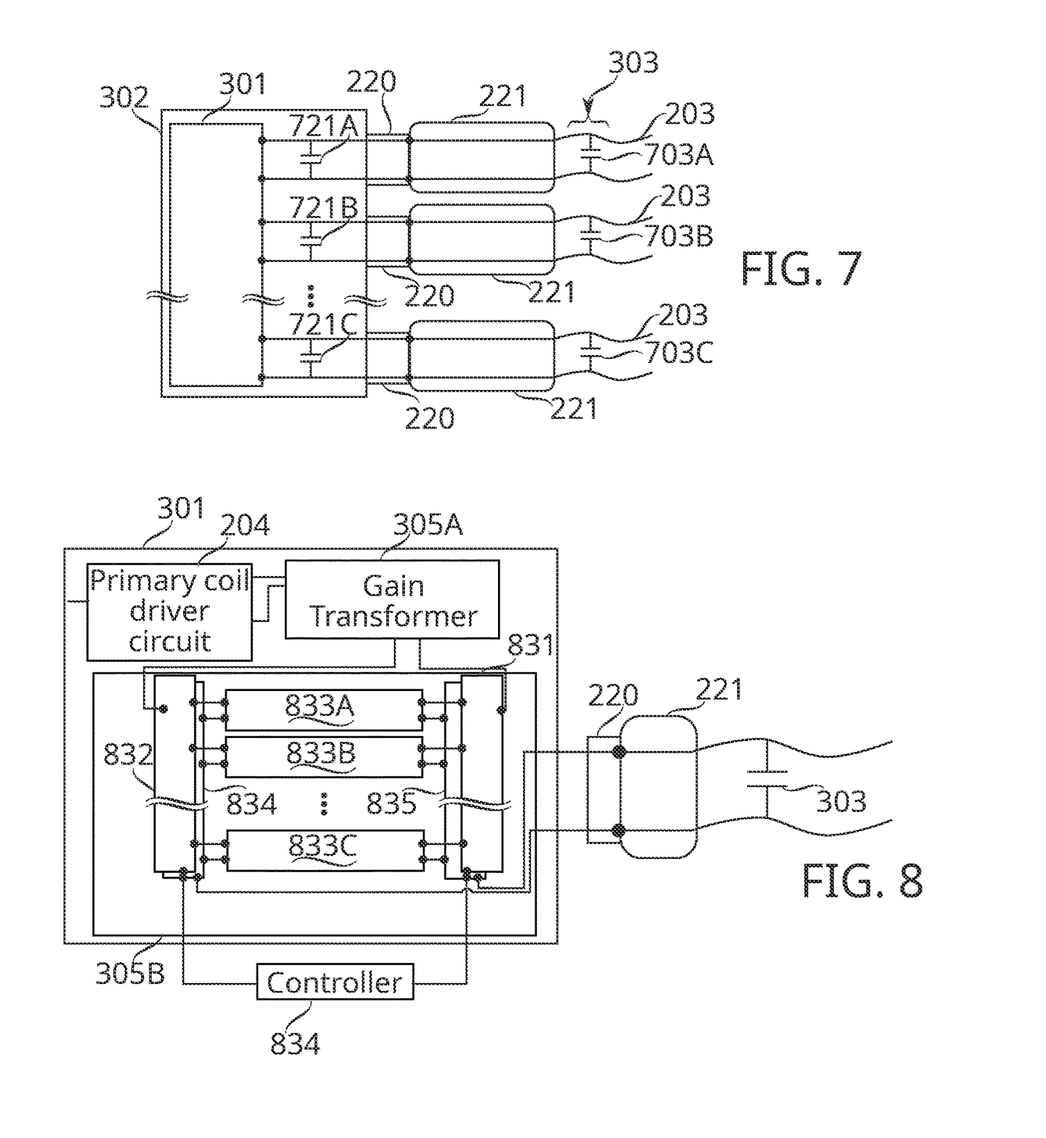
FIG. 7 schematically illustrates a system for port-selectable capacitive compensation of the intrinsic capacitance of the transmission line of a plasma probe, according to some embodiments of the present disclosure.
FIG. 8 schematically illustrates a system providing multi-transformer impedance selection for use with the final transformer stage of a plasma power supply, according to some embodiments of the present disclosure.

Variable capacitance 421 may be selectable from among a plurality of discrete capacitances, and FIGS. 5-7 show several different methods of implementing such a system.

In some embodiments, variable capacitor 421 is a continuously variable capacitor, provided as part of a capacitance control system 401 that allows variable capacitor 421 to be mechanically or electrically (e.g., by voltage and/or digitally) tuned, according to its type (several types of variable capacitor are known in the art). Accordingly, capacitance control system 401 can implement variable capacitance control, e.g., via mechanical controls (e.g., a knob), and/or via computerized graphical user interface. Particularly in the case of electrically tunable variable capacitors, the variable capacitor 421 plus tuning controller 401 can be used in place of a multiplexer and capacitor bank as is described, for example, in relation to FIGS. 6A-6C. Automated mechanical tuning via motorized operation of capacitance control system 401 is also an option.

Reference is now made to FIG. 5, which schematically illustrates selectable-capacitor compensation of the intrinsic capacitance of a transmission line of a plasma probe 62, according to some embodiments of the present disclosure.

FIG. 5 illustrates a mechanical method of selecting from among a plurality of individual capacitors of capacitor bank 521, by mechanically adjusting the setting of rotary selector 522, by hand, or (optionally) motorized. Each capacitor of capacitor bank 521 corresponds to a different value which is added to the intrinsic capacitance 303 of transmission line 203.

To provide a greater range of options, optionally, more than one capacitor can be selected in combination. For example, there may be provided a plurality of capacitor banks 521, each selected from by a different rotary selector 5220. One bank selects from among small capacitor values, and one from among larger capacitor values, so that the two in combination provide a finer division of the overall range than the bank of larger capacitor values alone can provide.

Reference is now made to FIGS. 6A-6C, which schematically illustrate various methods of controlling multiplexed capacitor compensation of the intrinsic capacitance of a transmission line of a plasma probe 62, according to some embodiments of the present disclosure.

In the example of FIG. 6A, a multiplexer 622 is controlled by signals selected via GUI 602 to select one of the capacitors of capacitor bank 621. As tier the case of FIG. 5, there may be a plurality of capacitor banks 621 from which capacitors are selected and used in combination.

In the example of FIG. 6B, a connector 221 is provided with an identifying element 603. Following the automatic identification, the system automatically sets a suitable compensation capacitance for that probe.

The identifier, in some embodiments, comprises an identifying resistance $R_{Identifier}$ that connects with identifying circuitry in controller 605 when connector 221 is plugged into power supply-side connector 220. The resistor value may be, for example, in the range of 1-10 kΩ. In some embodiments, the identifier value is different for probes of different lengths, models, and/or types. When the probe is plugged into the generator, the identifier is measured by a decoding unit in controller 605, and controller 605 in turn selects the correct compensation capacity, e.g., via control line and a switch, for example, a control line to multiplexer 622. In some embodiments, the value of $R_{Identifier}$ is selected to indicate directly which compensation capacitor from capacitor bank 621 to select. In some embodiments, the value of $R_{Identifier}$ is selected to be proportional to the value of capacitance 303, and a compensation capacitor selected accordingly.

In some embodiments, another type of identifier is used. For example, an RFID (radio frequency identification) tag can be used, or another identifier encoded as a numeric value; e.g., an EEPROM wired to probe contacts, or an optically coded identifier.

Figure 10:
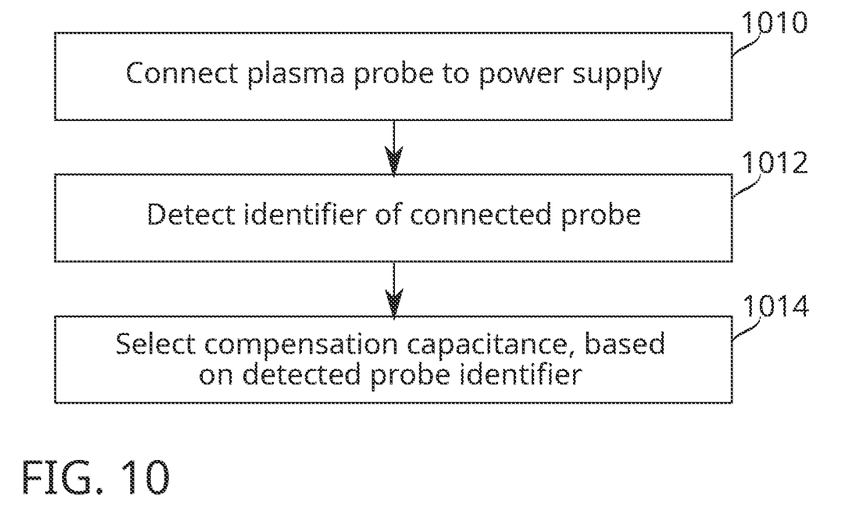
FIG. 10 schematically illustrates a method of automatically compensating for plasma probe capacitance, according to some embodiments of the present disclosure.

Brief reference is now made to FIG. 10, which schematically illustrates a method of automatically compensating for plasma probe capacitance, according to some embodiments of the present disclosure. At block 1010, in some embodiments, the plasma probe, comprising an identifier element, is connected to the plasma power supply. At block 1012, in some embodiments, the identifier of the connected probe is accessed, and the plasma probe identified accordingly. At block 1014, in some embodiments, a compensation capacitance (and/or, in some embodiments, an appropriate transformer impedance) is selected, based on the identification of the connected probe, the identification being also associated with an expected capacitance value of the connected probe. The compensation is selected to achieve an operating frequency of the power supply which is within and/or closed available to a targeted operating frequency of the power supply and plasma probe.

In the example of FIG. 6C, tuning of compensation capacitance is managed automatically based on frequency sensing.

In some embodiments, frequency metering circuit 632 (preferably itself with low input capacitance) is connected in parallel to the outputs of power supply 301. Upon the initiation of a high voltage oscillating signal, the frequency metering circuit 632 measures the resulting frequency. The measurement is provided to control circuit 631, which selects (e.g, via control signals sent to multiplexer 622) an appropriate compensation capacitor for trimming the frequency to within a desired margin of a targeted value, or within a range otherwise defined. Optionally, if the line impedance changes during application of plasma, the frequency metering circuit 632 detects the resulting change in resonance and control circuit 631 compensates accordingly.

Optionally and conversely, in some embodiments, power is controlled by deliberately "detuning" the resonant frequency. In such embodiments, control circuit 631 operates to select a capacitor from capacitor bank 621 which will result in a resonant frequency that interfaces inefficiently with power supply 301. This can be used to modulate power, which may be treated in turn as a measure of a rate of dosing. Over relatively long periods (e.g., milliseconds to seconds), average power can be controlled by switching back and forth between a plurality of capacitors at a higher frequency duty cycle. This allows relatively fine control of power, even when switching between just two different operating frequencies (an efficient and a less-efficient frequency). Measurements by frequency metering circuit 632 may be used to verify performance and/or, for example, be used as an input to help estimate actual power, dosing rate, and/or cumulative dosing and/or plasma energy.

Frequency metering circuit 632 can additionally or alternatively be used for malfunction detection and/or monitoring of plasma emission. For example, if the initial frequency measurement exceeds known process/probe variance, this may be reported as a fault, likely due to a malfunctioning probe. This can be caused by a short circuit (e.g., shorted probe) or an open circuit (e.g., missing or disconnected probe). Optionally (and potentially even after capacitance compensation), the operating frequency and plasma probe are determined to be operating together at an efficacy of plasma production other than (e.g., lower than) a targeted efficacy (e.g., efficacy measured in terms of the power which produces plasma)—but still efficacious enough (producing enough plasma) for basic operation. For example, relative to a nominal (e.g., targeted) efficacy, the actual efficacy of plasma generation may be determined to be, e.g., 80%, 90%, or 95% efficient. Potentially, the efficacy may even be larger than 100% of nominal efficacy (e.g., if the nominal efficacy is de-rated from a maximum achievable efficacy). In some embodiments, the difference between targeted and actual efficacy is further compensated for, e.g., by adjusting one or more of: a time of plasma exposure, a rate of plasma scanning, a composition and/or flow rate of ionization gas, a supplied ionizing voltage, and/or another parameter of plasma generation.

A short-circuit condition may inherently terminate power signal oscillation, e.g., due to the lack of a feedback signal of appropriate frequency to entrain power generation. The lack of oscillations is detected by the frequency meter which can then trigger associated safety circuitry, e.g., by means of a signal sent from control circuit 631 to power supply 301.

Similarly, an open-circuit condition along the transmission line may result in a sharp increase of oscillation frequency. Optionally, upon detection of such a rise in frequency (e.g., exceeding pre-defined threshold), safety circuitry can be triggered. In case the rise in resonant frequency alternatively manifests as a cessation of power signal oscillation, this would also lead to safety circuitry triggering. In some embodiments, safety circuitry triggering shuts down power signal generation. Optionally, the open-circuit condition simply triggers the selection of a capacitor having the full nominal value of capacitance needed for power generation to continue.

Furthermore, upon application of plasma to a conducting and/or capacitive target, a mild decrease in oscillation frequency potentially occurs. This may be due, for example, to the increased current draw from the generator. In some embodiments, the frequency change is measured, and interpreted as an indication correlated to the amount of power applied at the plasma end of the probe. Though by itself not necessarily accurate as an indication of absolute power delivery (e.g., since target characteristics affect its magnitude), measurements of frequency change can be cross-referenced with other power-metering techniques to increase overall accuracy and confidence of the power output measurement. Frequency fluctuations may also be useful as operator feedback to indicate the spatial relationship between probe and target.

Figure 9:
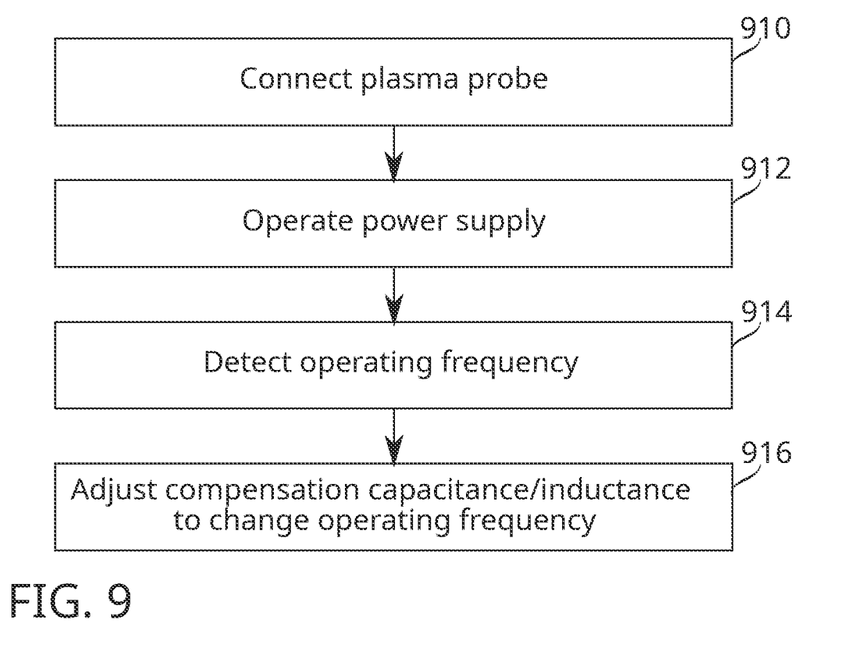
FIG. 9 schematically illustrates a method of automatically compensating for plasma probe capacitance, according to some embodiments of the present disclosure.

Brief reference is now made to FIG. 9, which schematically illustrates a method of automatically compensating for plasma probe capacitance, according to some embodiments of the present disclosure. At block 910, in some embodiments, the plasma probe, comprising an identifier element, is connected to the plasma power supply. At block 912, in some embodiments, the power supply is operated, together with the plasma probe. At block 914, in some embodiments, an actual operating frequency of the power supply and plasma probe is measured. At block 916, in some embodiments, a compensation capacitance (and/or, in some embodiments, an appropriate transformer impedance) is selected, based on the measured frequency. The compensation is selected to achieve an operating frequency of the power supply which is within and/or closed available to a targeted operating frequency of the power supply and plasma probe.

Reference is now made to FIG. 7, which schematically illustrates a system for port-selectable capacitive compensation of the intrinsic capacitance of the transmission line of a plasma probe 62, according to some embodiments of the present disclosure.

In some embodiments, a plurality of supply-side connectors 220 are provided to an enclosure 302 of a power supply 301, each connected to a different compensating capacitance 721A-721C. According to the respective intrinsic capacitance 703A-703C (examples of capacitance 303) of a plasma probe's transmission line 203. Generally one plasma probe 62 at a time is plugged in and used.

Optionally, two or more of the ports are occupied at once (linked in parallel to the power supply 301). Power transmission may be provided through each connected probe, so long as the power handling capability of power supply 301 is sufficient. In some embodiments, disconnected ports are connected to a "dummy" load (which is removed by and/or upon attachment of a probe), which oscillates but is not actually a plasma probe. This may have the result of maintaining power supply oscillation when there is no connected plasma probe. This may be used, for example, to allow dynamically plugging in plasma probes to any number of ports, so that, e.g., a plurality of plasma probes may be used simultaneously, with conversion to single probe use being simply a matter of detaching the additional plasma probes. Optionally, a pseudo-port is provided with a permanently attached capacitance to permanently provides an oscillating feedback signal, whether or not a plasma probe is attached.

Optionally, probes are manufactured with different plug keying and/or color coding on their connectors so that it is clear which probe should go with which supply-side connector 220.

Optionally, it is transformers (or at least secondary coils of transformers) of various inductance values which are individually connected with different supply-side connectors 220. This allows a potential advantage to reach higher frequencies with shorter (or otherwise lower-capacitance) probes, should the circuitry e.g., of power supply 301 be capable of tuning and/or possessed of a sufficiently broad spectrum of operating frequencies. For example, a higher frequency of operation may provide efficiency gains which justify a preference for a shorter plasma probe transmission line 203 when practical. The multi-port approach (each supply-side connector being considered as a single port) may be combined with other any other scheme or schemes for capacitance and/or inductance selection, for example as described herein, to support a larger and/or more finely selectable range of compensations to be selected. For example, there may be high- and low-compensation range ports, each of which is associated with its own bank of selectable capacitors, or which add a different fixed capacitance into a shared bank of selectable capacitors.

Reference is now made to FIG. 8, which schematically illustrates a system providing multi-transformer impedance selection for use with the final transformer stage of a plasma power supply 301, according to some embodiments of the present disclosure.

In some embodiments, a plurality of selectable transformers 833A-833C are provided within the decoupling transformers stage 305B of a power supply 301. Just one transformer stage (the final one) is shown within the block of decoupling transformer(s) 305B, although there may optionally be others between it and the block of gain transformer 305A.

In some embodiments, transformer selecting is performed by selection of ports used by multiplexers (and/or relay sets) 831, 832, 834, 835 under the control of controller 834. In the illustrated case, both primary and secondary coils are selected together, however, this is not necessarily the only operable topology, depending on available components and the range of supported transmission line capacitances and/or operating parameters. For example, a transformer may be provided with multiple taps, with tap selection being adjustable on one or both sides of the transformer; and optionally in concert or independently.

Controller 834 may itself operate based on any suitable selection principle to match transmission line capacitance 303 with appropriate compensating componentry; for example, one of the principles described in relation to FIGS. 6A-6C. Additionally or alternatively, a selection principle described in relation to one or more of FIGS. 3-5 and 7 is used.

In some embodiments, transformer options are selected to help maintain relatively constant frequency and/or power output across the various range of probes. Additionally or alternatively, they can be selected to change the operating frequency of any particular connected probe. Changing transformers and/or transformer characteristics also provides a potential advantage by allowing modification of voltage gain, which is another way to adjust plasma generating power, optionally with or without maintaining a constant operating frequency. For example, there may be two transformers with identical secondary coil inductance but different primary coil inductance, leading to two different gain settings but similar resonance frequency.

General

As used herein with reference to quantity or value, the term "about" means "within ±10% of".

The terms "comprises", "comprising", "includes", "including", "having" and their conjugates mean: "including but not limited to".

The term "consisting of" means: "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

The words "example" and "exemplary" are used herein to mean "serving as an example, instance or illustration". Any embodiment described as an "example" or "exemplary" is not necessarily to be construed as preferred or advantageous over other embodiments and/or to exclude the incorporation of features from other embodiments.

The word "optionally" is used herein to mean "is provided in some embodiments and not provided in other embodiments", Any particular embodiment of the present disclosure may include a plurality of "optional" features except insofar as such features conflict.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition or substantially preventing the appearance of clinical or aesthetical symptoms of a condition.

Throughout this application, embodiments may be presented with reference to a range format. It should be understood that the description in range format is merely for convenience and brevity and should not be construed as an inflexible limitation on the scope of descriptions of the present disclosure. Accordingly, the description of a range should be considered to have specifically disclosed all the possible subranges as well as individual numerical values within that range. For example, description of a range such as "from 1 to 6" should be considered to have specifically disclosed subranges such as "from 1 to 3", "from 1 to 4", "from 1 to 5", "from 2 to 4", "from 2 to 6", "from 3 to 6", etc.; as well as individual numbers within that range, for example, 1, 2, 3, 4, 5, and 6. This applies regardless of the breadth of the range.

Whenever a numerical range is indicated herein (for example "10-15", "10 to 15", or any pair of numbers linked by these another such range indication), it is meant to include any number (fractional or integral) within the indicated range limits, including the range limits, unless the context clearly dictates otherwise. The phrases "range/ranging/ranges between" a first indicate number and a second indicate number and "range/ranging/ranges from" a first indicate number "to", "up to", "until" or "through" (or another such range-indicating term) a second indicate number are used herein interchangeably and are meant to include the first and second indicated numbers and all the fractional and integral numbers therebetween.

Although descriptions of the present disclosure are provided in conjunction with specific embodiments, it is evident that many alternatives, modifications and variations will be apparent to those skilled in the art. Accordingly, it is intended to embrace all such alternatives, modifications and variations that fall within the spirit and broad scope of the appended claims.

It is appreciated that certain features which are, for clarity, described in the present disclosure in the context of separate embodiments, may also be provided in combination in a single embodiment. Conversely, various features, which are, for brevity, described in the context of a single embodiment, may also be provided separately or in any suitable subcombination or as suitable in any other described embodiment of the present disclosure. Certain features described in the context of various embodiments are not to be considered essential features of those embodiments, unless the embodiment is inoperative without those elements.

It is the intent of the applicant(s) that all publications, patents and patent applications referred to in this specification are to be incorporated in their entirety by reference into the specification, to the same extent as if each individual publication, patent or patent application was specifically and individually noted when referenced that it is to be incorporated herein by reference. In addition, citation or identification of any reference in this application shall not be construed as an admission that such reference is available as prior art to the present disclosure. To the extent that section headings are used, they should not be construed as necessarily limiting. In addition, any priority document(s) of this application is/are hereby incorporated herein by reference in its/their entirety.

What is claimed is:

1. Power supply circuitry for a non-thermal plasma generator, the circuitry comprising:
   a driver circuit, configurable to generate an alternating current power signal at an operating frequency of at least 500 kHz;
   an output stage circuit, connected to receive the alternating current power signal from the driver circuit, and to provide a feedback signal to the driver circuit entraining the driver circuit to produce the power signal at said operating frequency;
   a plasma probe having a distal end comprising a plasma generating site, and a proximal end coupled to the driver circuit via the output stage circuit, the distal and proximal ends being interconnected by a transmission line having an intrinsic capacitance in proportion to a length of the transmission line;
   the output stage circuit having plurality of transformers comprising at least a final transformer and an initial gain transformer;
   at least one compensation capacitor, selectable and/or adjustable among a plurality of capacitances;
   wherein a selected and/or adjusted compensation capacitor of the at least one compensation capacitor:
   is positioned in electrical parallel with the intrinsic capacitance of the transmission line, and
   has a capacitance that compensates an LC network comprising the intrinsic capacitance and a secondary coil of the final transformer to resonate at the operating frequency, when the driver circuit is operated to generate the power signal.

2. The power circuitry of claim 1, wherein:
   the final transformer comprises the secondary coil and a primary coil, and is electrically connected from the secondary coil of the final transformer to the plasma probe, and
   the initial gain transformer comprises a secondary coil and a primary coil, and is electrically connected to the plasma probe from the secondary coil of the initial gain transformer via the final transformer, and electrically connected to the driver circuit from the primary coil of the initial gain transformer.

3. The power supply circuitry of claim 1, wherein:
   an inductance of the secondary coil of the final transformer is selected so that the LC network resonates at the operating frequency when a longest supported plasma probe having a longest supported transmission line length is connected without the selected and/or adjusted compensation capacitor;
   the plasma probe has a transmission line length shorter than the longest supported transmission line length; and
   a sum of the capacitance of the selected and/or adjusted compensation capacitor and the intrinsic capacitance of the shorter transmission line is matched to the intrinsic capacitance of the longest supported transmission line.

4. The power supply circuitry of claim 1, wherein the selected and/or adjusted compensation capacitor is provided as component of the plasma probe, and is selected by selection of the plasma probe.

5. The power supply circuitry of claim 1, wherein a proximal-side connector of the plasma probe comprises the at least one compensation capacitor.

6. The power supply circuitry of claim 1, wherein the at least one compensation capacitor is provided together with the driver circuit, and the plasma probe electrically connects to it upon being attached to the driver circuit through the output stage circuit.

7. The power supply circuitry of claim 6, wherein the at least one compensation capacitor comprises a plurality of compensation capacitors, and the power supply circuitry comprises a controller to select the selected and/or adjusted compensation capacitor from among the plurality of compensation capacitors and connect it to the plasma probe.

8. The power supply circuitry of claim 7, wherein the controller comprises a manually operated switch.

9. The power supply circuitry of claim 7, wherein the controller comprises an electrically operated switch.

10. The power supply circuitry of claim 9, wherein the electrically operated switch is one of a plurality of multiplexed switches.

11. The power supply circuitry of claim 7, wherein the controller selects and/or adjusts the selected and/or adjusted compensation capacitor according to user-inputted commands from a graphical user interface.

12. The power supply circuitry of claim 7, comprising an identifier detector; and wherein the controller selects and/or adjusts the selected and/or adjusted compensation capacitor in accordance with an identifier element associated with the plasma probe and providing an identifier sensed by the identifier detector, and a compensation capacitance associated with the identifier.

13. The power supply circuitry of claim 12, wherein the identifier comprises a resistance value measured when the plasma probe is electrically connected to the driver circuit.

14. The power supply circuitry of claim 12, wherein the identifier comprises a numeric value.

15. The power supply circuitry of claim 7, comprising a frequency detector; and wherein the controller selects the compensation capacitor based on an identified actual frequency of operation of the device, and its difference from the operating frequency of at least 500 kHz.

16. A method of plasma generation, the method comprising:
   providing a power supply configured to drive a higher-capacitance plasma probe at a first frequency in conjunction with a secondary coil of a coupling transformer, the capacitance of the higher-capacitance plasma probe including an intrinsic capacitance of a transmission line of the higher-capacitance plasma probe;
   providing a lower-capacitance plasma probe having a transmission line with a lower intrinsic capacitance than the intrinsic capacitance of the transmission line of the higher-capacitance plasma probe;
   selecting a compensating capacitor, based on the difference between the capacitances of the higher-capacitance plasma probe and the lower-capacitance plasma probe;
   electrically connecting the compensating capacitor in parallel with the intrinsic capacitance of the lower-capacitance plasma probe; and
   operating the lower-capacitance plasma probe at the first frequency.

17. The method of claim 16, wherein an RC network comprising the secondary coil and the transmission line of the lower-capacitance plasma probe, and without the compensating capacitor, resonates at a second frequency higher than the first frequency.

18. The method of claim 16, wherein the RC compensating capacitor has a capacitance about equal to the difference between the capacitances of the higher-capacitance plasma probe and the lower-capacitance plasma probe.

19. The method of claim 16, wherein the selecting selects the compensation capacitor from among a plurality of capacitors and/or adjusts a capacitance of the compensation capacitor.

20. A set of at least two plasma probes, each comprising a respective distally-positioned plasma generating site, a proximally-positioned connector configured to connect to a plasma power supply, and a transmission line interconnecting the connector and the plasma generating site; and wherein:

the plasma probes each comprise a respective compensation capacitor, the compensation capacitors have rated values at least 10% different than one another, and respective intrinsic capacitances of the transmission lines are more different from one another in capacitance value than respective sums of intrinsic capacitances and compensation capacitors are different from one another in capacitance value.

21. The set of at least two plasma probes of claim 20, wherein the difference in capacitance values of the transmission lines is reduced by at least by a factor of 2 in the respective sums of intrinsic capacitance and compensation capacitor capacitance.

22. The set of at least two plasma probes of claim 20, wherein transmission lines are different from each other in length by at least 10 cm.

* * * * *